United States Patent [19]

Essers

[11] 4,233,489
[45] Nov. 11, 1980

[54] METHOD OF AND DEVICE FOR PLASMA MIG-WELDING

[75] Inventor: Wilhelmus G. Essers, Emmasingel, Netherlands

[73] Assignee: U.S. Philips Corporation, New York, N.Y.

[21] Appl. No.: 894,756

[22] Filed: Apr. 10, 1978

Related U.S. Application Data

[63] Continuation of Ser. No. 558,018, Mar. 13, 1975, abandoned.

[30] Foreign Application Priority Data

Mar. 25, 1974 [NL] Netherlands ............................ 7403866

[51] Int. Cl.² ................................................. B23K 9/00
[52] U.S. Cl. ............................... 219/121 P; 219/76.16; 219/124.1
[58] Field of Search ................ 219/121 P, 121 R, 75, 219/124.1, 76.16, 137 R; 313/231.3

[56] References Cited

U.S. PATENT DOCUMENTS

| | | | |
|---|---|---|---|
| 3,612,807 | 10/1971 | Liefkens | 219/121 P |
| 3,830,997 | 8/1974 | Essers et al. | 219/121 P |
| 3,891,824 | 6/1975 | Essers et al. | 219/121 P |

OTHER PUBLICATIONS

"Plasma MIG Welding," Welding and Metal Fabrication, 12-1974, Sheet #46.

*Primary Examiner*—B. A. Reynolds
*Assistant Examiner*—M. H. Paschall
*Attorney, Agent, or Firm*—Thomas A. Briody; William J. Streeter; Rolf E. Schneider

[57] ABSTRACT

Plasma-MIG welding wherein a plasma arc is initially established between a non-consumable electrode and a workpiece to initate and sustain a non-deviated plasma flow therebetween, welding wire is supplied along a path generally parallel to but laterally displaced from the plasma flow path, and a MIG arc is thereafter struck between the welding wire and the workpiece, whereby the plasma flow is laterally displaced by and drawn to the MIG arc to substantially concentrically surround the same.

2 Claims, 4 Drawing Figures

METHOD OF AND DEVICE FOR PLASMA MIG-WELDING

This is a continuation, of application Ser. No. 558,018, filed Mar. 13, 1975 now abandoned.

This invention relates to a method of plasma MIG-welding, in which a plasma is produced in an inert gas flow by an electric arc between a non-consumable electrode and a workpiece, a MIG-arc is ignited and maintained between a consumable electrode and the workpiece and the consumable electrode is made to melt in the plasma.

Such a method is already known from U.S. Pat. No. 3,612,807. In this known method, the plasma is contracted by a nozzle, the consumable electrode being conveyed axially along the axis of the plasma. In this method which has wide possibilities of application, welding may be carried out with alternating current or with direct current, and with positive or negative polarity of the electrodes.

As explained in U.S. Pat. No. 3,891,824, a non-rotating MIG-arc having a concentrated material transfer or a rotating MIG-arc having a spread material transfer can be obtained with positive polarity of the electrodes in accordance with the current intensity in the consumable electrode.

It is an object of the invention to provide a method of plasma-MIG welding which is simpler than the known method and which can be carried out with a simpler and more compact welding torch.

According to the invention this object is achieved in that the consumable electrode is supplied eccentrically with respect to the plasma arc and in a direction parallel to the plasma arc and is conveyed along the plasma arc, the plasma, after ignition of the MIG-arc, being drawn substanially concentrically around the current conveying consumable electrode.

Surprisingly it has been found that the consumable electrode can be made to melt along the axis of the arc plasma without contraction of the plasma by means of a nozzle and without it being necessary for the consumable electrode to be initially supplied axially along the axis of the plasma. As soon as the MIG arc is ignited, the plasma which is produced by the plasma arc between the non-consumable electrode and the workpiece is drawn around the current conveying consumable electrode which is now surrounded by a jacket of ionized gas whereby the consumable electrode is situated substantially along the axis of the plasma. Although the plasma is not contracted by a nozzle, a contraction of the plasma does occur by means of the Lorenz force which the current-conveying consumable electrode exerts on the charge carriers of the plasma.

It is to be noted that from U.S. Pat. No. 2,868,954 there is a known method in which a current conveying consumable electrode is supplied in a direction parallel to an arc between a non-consumable electrode and a workpiece. In this method, the arc periodically jumps from one electrode to the other; the consumable electrode is not surrounded by the plasma.

The method according to the invention has a number of advantages as compared with the methods known from U.S. Pat. Nos. 3,612,807 and 3,891,824.

Since the plasma is not contracted by a nozzle, welding may be carried out with a voltage of the plasma arc which is approximately 50% (10–20 V) lower; as a result of this the stability of the plasma arc is increased.

In the case of a non-rotating MIG-arc with a comparatively low current in the consumable electrode, considerably more material can be melted per unit of time.

For carrying out the method, a welding torch may be used which has a comparatively wide nozzle the wall of which does not contact the hot plasma; this increases the life of the nozzle; moreover it is not necessary to insulate the nozzle with respect to the contact tube which serves to supply and guide the consumable electrode.

The contact tube may be placed along the axis of the welding torch in a conventional manner. Preferably, however, a welding torch is used which is known per se from the already mentioned U.S. Pat. No. 2,868,954 and which comprises a housing having a nozzle with an outflow aperture and a connection for the supply of a gas, a non-consumable electrode and a contact tube being arranged in the housing on either side of the centre line of the housing. According to the invention said welding torch is characterized in that the outflow aperture has an elongate cross-section, the centre lines of the non-consumable electrode and of the contact tube, as well as the long axis of the outflow aperture being situated in the same plane. This results in a very compact torch construction of comparatively small transverse dimensions.

The invention will be described in greater detail with reference to the drawings, in which.

Figure 1:
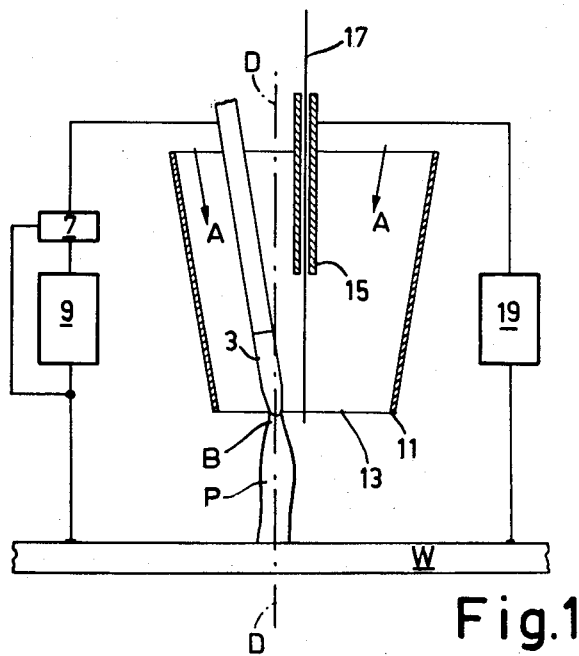
FIGS. 1 and 2 show diagrammatically a device for carrying out the method according to the invention.
Figure 2:
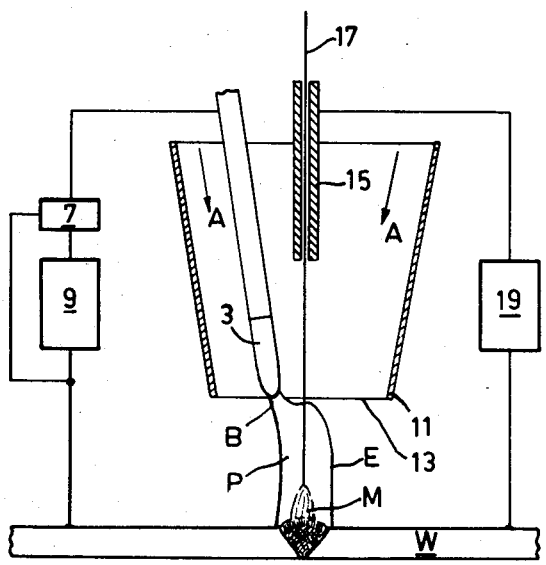

In FIGS. 1 and 2 the method according to the invention is shown in various phases. A plasma arc B is maintained in an inert gas flow A, for example argon, between a non-consumable electrode 3 and a workpiece W, so that an ionized gas flow P, hereinafter referred to as plasma, is produced. The non-consumable electrode 3 which may be tungsten or copper which is water-cooled is connected, via a HF generator 7, to one of the terminals of a supply source 9, the other terminal of which is connected to the workpiece W. The inert gas flow A if conveyed in the direction of the workpiece W by means of a nozzle 11. The outflow aperture 13 of the nozzle 11 is proportioned to be so wide as to not contract the plasma. A contact tube 15 serves to supply and guide a welding wire 17. Via the contact tube 15 the welding wire 17 can be connected to one of the terminals of a second supply source 19 the other terminal of which can be connected to the workpiece W. Welding may be carried out either with alternating current or with direct current and with positive or negative polarity of the non-consumable electrode 3 and of the welding wire 17.

FIG. 1 shows the situation in which the welding wire 17 conveys no current. The contact tube 15 is arranged beside the non-consumable electrode 3 in such a manner that the welding wire 17 does not follow the centre line D—D of the plasma P but is guided at some distance away from the plasma P.

FIG. 2 shows the situation in which, in addition to the plasma arc B, a MIG-arc M is started and maintained between the welding wire 17 and the workpiece W. It has surprisingly been found that the plasma P is drawn around the current conveying welding wire 17 and surrounds it with a sheath E in such manner that the welding wire now is in the centre line of the transversely displaced plasma P. Although the plasma P is not contracted by the nozzle 11, a contraction of the plasma P does nevertheless take place under influence of the Lorenz force which the welding wire 17 exerts on the charge carriers of the plasma P.

Figure 3:
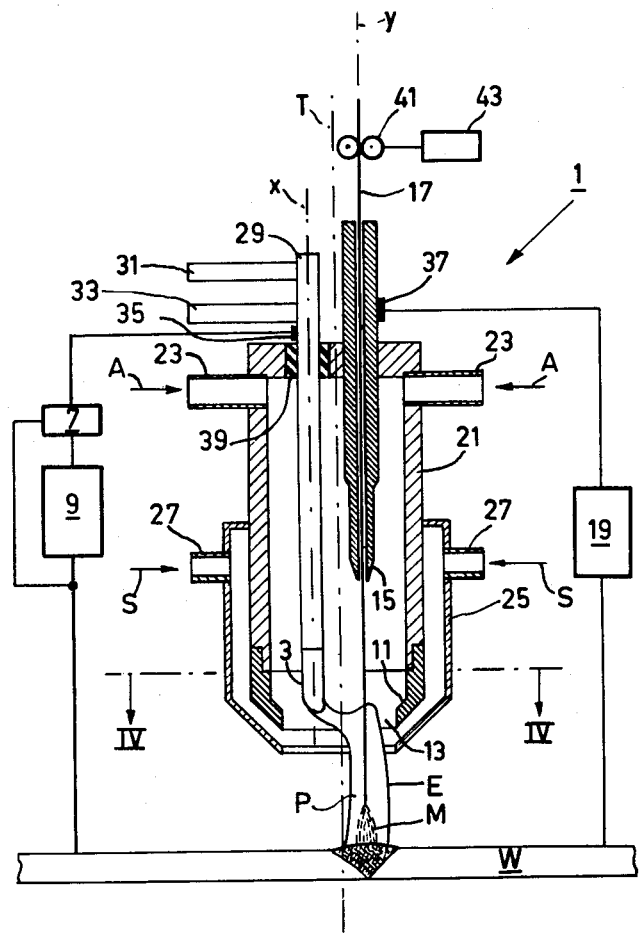
FIG. 3 shows a practical embodiment of a welding torch according to the invention.

FIG. 3 shows a practical embodiment of a welding torch 1 which has an asymmetric construction and in which the non-consumable electrode 3 and the contact tube 15 are arranged on either side of the centre line T in the housing 21 of the welding torch. The housing 21 has a nozzle 11 with aperture 13 and has connections 23 for the supply of an inert gas flow A. A shielding gas S can be supplied through communications 27 in a hood 25. The non-consumable electrode 3 which in the present embodiment is of tungsten, is mounted in a copper holder 29 which is cooled via cooling water connections 31 and 33 and further cooling ducts not shown. The nozzle 11 and the housing 21 can be provided with cooling ducts in the conventional manner. Via a HF generator 7, the electrode holder 29 can be connected to one of the two terminals of a supply source 9 by means of a connection 35, the other terminal being connected to a workpiece W. By means of a connection 37 the contact tube 15 can be connected to one of the terminals of a second supply source 19, the other terminal of which is also connected to the workpiece W. The holder 29 is insulated with respect to the housing 21 by means of an insert 39 of synthetic material. The transport of the welding wire 17 is carried out by means of rollers 41 which are driven by a motor 43 at controllable speed.

Figure 4:
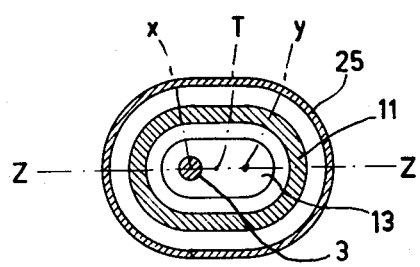
FIG. 4 is a cross-sectional view of the welding torch taken on the line IV—IV of FIG. 3.

As shown in FIG. 4, both the housing 21 and the aperture 13 have elongate cross-sections, the centre line X of the non-consumable electrode 3, the centre line Y of the contact tube 15, and the long axis Z—Z of the outflow aperture being situated in the same plane, in FIG. 3 the plane of the drawing.

In the embodiment described, the non-consumable electrode 3 is in the form of a rod. In particular, the end loaded by the plasma arc may have a different design, for example, be hook-like or semi-annular, when the arrangement with respect to the contact tube 15 is such that, when the welding wire conveys no current, a plasma is produced directly between the electrode 3 and the workpiece W, which plasma is drawn around the welding wire when the welding wire does convey current.

What is claimed is:

1. A method of plasma-MIG welding, which comprises flowing a thermally ionizable gas past a non-consumable electrode through a non-constricting nozzle toward a workpiece; initially establishing a plasma arc between said non-consumable electrode and said workpiece to initiate and sustain a plasma flow extending through the nozzle along a non-deviated direct path from the non-consumable electrode to the workpiece; initially feeding a consumable electrode through the nozzle toward the workpiece along a path generally parallel to the direct path of said plasma flow but laterally spaced and separated from the same; and thereafter striking a MIG-arc between the consumable electrode and the workpiece, the resulting MIG-arc thereby laterally displaying the plasma flow from its initial direct path and drawing the same to said MIG-arc to substantially concentrically surround the latter, a slight constriction of said laterally displaced plasma flow being simultaneously effected by said MIG-arc, said slight constriction being caused solely by said MIG-arc.

2. A method according to claim 1, in which the non-consumable electrode and the consumable electrode are positioned such that their respective center lines are situated on either side of the nozzle axis, said electrode center lines and said nozzle axis defining a plane.

* * * * *